United States Patent [19]

Korycan

[11] Patent Number: 5,287,553
[45] Date of Patent: Feb. 15, 1994

[54] METHOD FOR DETECTING THE ABSENCE OF A PORTABLE RADIOTELEPHONE FROM A MOBILE RADIOTELEPHONE SYSTEM

[75] Inventor: George M. Korycan, Union, Ill.

[73] Assignee: Motorola, Inc., Schaumburg, Ill.

[21] Appl. No.: 928,591

[22] Filed: Aug. 13, 1992

[51] Int. Cl.$^5$ .............................................. H04B 1/38
[52] U.S. Cl. .................................. 455/89; 455/343; 379/59; 340/568
[58] Field of Search ................ 455/89, 11.1, 127, 117, 455/343, 38.2; 379/57, 58, 59, 61, 88; 340/426, 568, 825.49, 825.36

[56] References Cited

U.S. PATENT DOCUMENTS

| | | | |
|---|---|---|---|
| 4,679,026 | 7/1987 | Knakowski | 340/426 |
| 4,893,348 | 1/1990 | Andoh | 455/343 |
| 4,974,251 | 11/1990 | Ohta et al. | 379/61 |
| 5,184,971 | 2/1993 | Williams | 379/88 |

Primary Examiner—Reinhard J. Eisenzopf
Assistant Examiner—Philip J. Sobutka
Attorney, Agent, or Firm—John J. King

[57] ABSTRACT

The process of the present invention alerts a radiotelephone user when the portable is not connected to the power booster/antenna extender system. By checking for a connect signal from the radiotelephone, the system knows the portable is missing and alerts the user, thus enabling the user to install the portable before driving off without it.

1 Claim, 2 Drawing Sheets

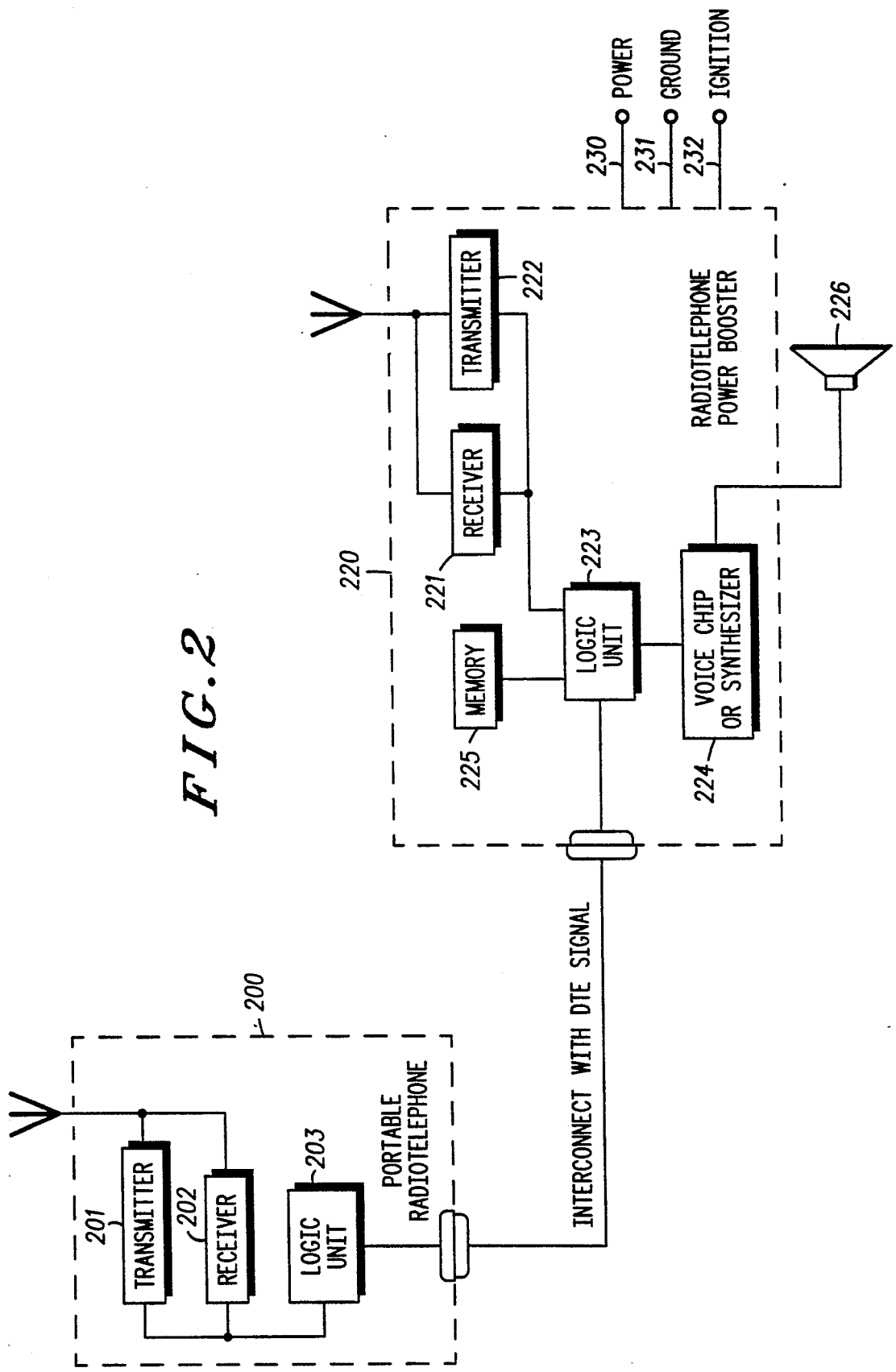

5,287,553

METHOD FOR DETECTING THE ABSENCE OF A PORTABLE RADIOTELEPHONE FROM A MOBILE RADIOTELEPHONE SYSTEM

FIELD OF THE INVENTION

The present invention relates generally to the field of communications and particularly to portable radiotelephones coupled to vehicular adapters.

BACKGROUND OF THE INVENTION

Portable cellular radiotelephones, a typical block diagram of which is illustrated in FIG. 3, have become a popular and convenient means of communication while away from a landline telephone. A radiotelephone user can communicate to other parties around the world while remaining mobile. A limitation of portable radiotelephones, however, is the reduced power and antenna gain compared to mobile radiotelephones.

To overcome these limitations, power boosters or antenna extenders have been mounted in automobiles to connect to the portable. A power booster increases a portable's typical 600 mW power to the power level of a mobile, 3 W. An antenna extender simply couples a portable's antenna to a higher gain antenna mounted on the exterior of the vehicle, thus providing better communications for the portable. The communication system formed by the connection of the portable to the booster or antenna extender uses the memory and functions of the portable while the transmit power from the portable is amplified to the cellular system limit.

The drawback with the power booster/antenna extender in combination with the portable is that the portable must be connected to the system in order to operate. The portability that makes the portable radiotelephone an asset reduces the likelihood that the radiotelephone user will remember to connect the portable to the booster/extender. The user may take the phone into the home or office and forget to connect it to the mobile system until having driven a considerable distance. There is a resulting need to alert the driver that the portable is not present in the booster/extender system.

SUMMARY OF THE INVENTION

The method of the present invention encompasses generating an alert in response to a communication device being absent from a communication system. The communication device has a system connection. The method first determines if the system connection is connected to the communication system. If the system connection is connected, the communication device is activated. If the system connection is not connected, an alert is generated.

BRIEF DESCRIPTION OF THE DRAWINGS

FIG. 2 shows a block diagram of a radiotelephone and power booster/antenna extender system having an alert generation capability.

DETAILED DESCRIPTION OF THE PREFERRED EMBODIMENT

Figure 1:
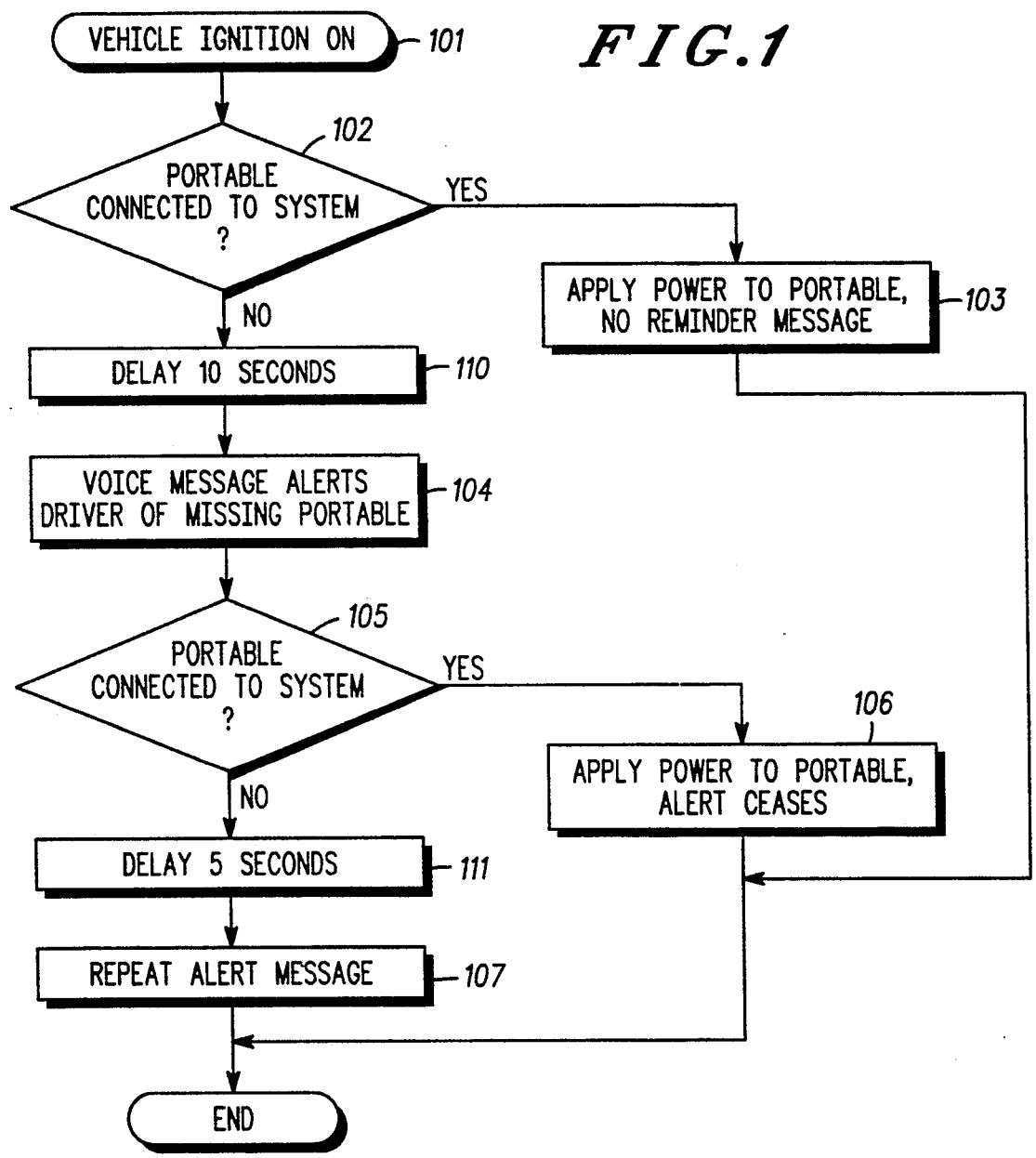
FIG. 1 shows a flowchart of the process of the present invention.

The process of the present invention prevents a radiotelephone user from forgetting to connect a portable radiotelephone to a mobile power booster/antenna extender. This gives the radiotelephone user the opportunity to connect the radiotelephone before driving off and leaving it at the home or office. For the purposes of this discussion, the radiotelephone will subsequently be assumed to be coupled to a power booster and is illustrated in FIG. 2.

The radiotelephone (200) is comprised of a transmitter (201), receiver (202), and a logic unit (203) that controls the radiotelephone (200). On power-up, the logic unit (203) generates a dte signal that informs the power booster that the radiotelephone is connected.

The radiotelephone power booster (220) is comprised of a receiver (221), a transmitter (222) able to operate at higher power levels, a logic unit (223) to control the booster (220), memory (225) to store telephone numbers and digitized voice messages, and a voice synthesizer circuit (224). A speaker (226) provides an output for the voice synthesizer circuit (224) as well as acting as a hands-free speaker for the radiotelephone (200). The process of the present invention is used by the logic unit (223) of the power booster (220).

Power (230) and a ground connection (231) is provided from the vehicle. An ignition line (232) from the vehicle's ignition system enables the power booster (220) to sense when the ignition has been enabled. The presence of the ignition signal (232) enables power to the communications system (200 and 220); the radiotelephone (200) receiving power through its interconnect to the power booster (220). At power-up, the booster logic unit (223) looks for a dte message from the portable's logic unit (203) that is sent during the portable's power-up sequence.

Referring to FIG. 1, the process of the present invention is initiated by the vehicle ignition being turned on (101). If the dte signal is detected by the booster's logic unit (102), the portable is present. No alert is activated from the booster logic unit to the voice chip and power is applied to the portable (103).

If the dte signal is not detected, the portable is not connected or is not operating properly. In this case, the process waits a short time (110), 10 seconds in the preferred embodiment, then generates an alert to warn the user that the portable must be installed (104). In the preferred embodiment, this alert is in the form of a voice message. An example of such a message is: "Portable missing, cellular telephone not available".

After the initial alert, the user has another chance to connect the portable radiotelephone to the power booster. In the preferred embodiment, the system waits 1 minute. During this time, the system checks for the dte message again to determine if the portable has been connected (105). If the portable has been connected (106), power is applied and the alert is not used. If the dte signal has still not been received, the portable has not been connected, the process waits (111) and then the alert message is repeated once more (107). This last delay is 5 seconds in the preferred embodiment. It is then assumed that the user does not want the portable connected. This process will not repeat until the automobile's ignition has been turned off and back on again.

Alternate embodiments of the process of the present invention can use other voice messages or alert tones to signal the absence of the portable. Additionally, alternate embodiments may delay a different length of time before generating the alert. An additional delay can also be used in after the first alert to allow time for the radiotelephone to be connected to the power booster.

I claim:

1. A method for generating a voice or visual alert in response to a portable radiotelephone not being connected to a mobile radiotelephone power booster apparatus, the portable radiotelephone generating a connect signal, the method comprising the steps of:

applying power to the mobile radiotelephone power booster apparatus;

determining if the connect signal is present;

applying power to the portable radiotelephone if the connect signal is present;

generating the voice or visual alert if the connect signal is not present;

waiting a predetermined time after generating the voice or visual alert; and repeating the voice or visual alert after the predetermined time has expired.

* * * * *